(12) United States Patent
Mackenzie et al.

(10) Patent No.: US 11,290,890 B2
(45) Date of Patent: Mar. 29, 2022

(54) RESOURCE MANAGEMENT METHOD

(71) Applicant: British Telecommunications Public Limited Company, London (GB)

(72) Inventors: Richard Mackenzie, London (GB); Yang Yang, Beijing (CN); Mo Hao, Beijing (CN)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 16/336,325

(22) PCT Filed: Sep. 22, 2017

(86) PCT No.: PCT/EP2017/074132
§ 371 (c)(1),
(2) Date: Mar. 25, 2019

(87) PCT Pub. No.: WO2018/060104
PCT Pub. Date: Apr. 5, 2018

(65) Prior Publication Data
US 2019/0223024 A1  Jul. 18, 2019

(30) Foreign Application Priority Data

Sep. 30, 2016  (CN) .......................... 201610875596.9

(51) Int. Cl.
*H04W 16/12* (2009.01)
*H04W 92/12* (2009.01)
(Continued)

(52) U.S. Cl.
CPC .......... *H04W 16/12* (2013.01); *H04L 5/0035* (2013.01); *H04L 5/0073* (2013.01); *H04W 28/16* (2013.01);
(Continued)

(58) Field of Classification Search
None
See application file for complete search history.

(56) References Cited

U.S. PATENT DOCUMENTS 10,182,352 B2     1/2019  Saffre et al.
2008/0014954 A1   1/2008  Matsumoto et al.
(Continued)

FOREIGN PATENT DOCUMENTS

CN    101873602 A     10/2010
CN    102006599 A     4/2011
(Continued)

OTHER PUBLICATIONS

International Search Report and Written Opinion for corresponding PCT Application No. PCT/EP2017/074059, dated Nov. 29, 2017, 9 pages.
(Continued)

*Primary Examiner* — Saumit Shah
(74) *Attorney, Agent, or Firm* — Patterson Thuente Pedersen, P.A.

(57) ABSTRACT

Embodiments of the present disclosure provide a resource management method and apparatus for a cell cluster and a communications system. The method includes: transmitting resource allocation information by a base station taken as a cluster head of the cell cluster to other base stations in the cell cluster. By transmitting the resource allocation information by the base station taken as the cluster head of the cell cluster to the other base stations in the cell cluster, resource allocation for the cells may be performed efficiently, capabilities of coordinating inter-cell interference may be improved, and as the cell cluster may be expanded to cell clusters of a lower level or more levels, scalability of the network may be improved.

13 Claims, 5 Drawing Sheets

(51) Int. Cl.

| | | |
|---|---|---|
| *H04W 28/16* | (2009.01) | |
| *H04L 5/00* | (2006.01) | |
| *H04W 28/18* | (2009.01) | |
| *H04W 72/08* | (2009.01) | |
| *H04W 92/20* | (2009.01) | |
| *H04W 88/08* | (2009.01) | |

(52) U.S. Cl.
CPC ......... *H04W 28/18* (2013.01); *H04W 72/082* (2013.01); *H04W 92/12* (2013.01); *H04W 88/08* (2013.01); *H04W 92/20* (2013.01)

(56) References Cited

U.S. PATENT DOCUMENTS

| | | |
|---|---|---|
| 2009/0310545 A1 | 12/2009 | Tateson et al. |
| 2010/0142454 A1 | 6/2010 | Chang |
| 2010/0172754 A1 | 7/2010 | Flanagan |
| 2011/0105138 A1 | 5/2011 | Morimoto et al. |
| 2011/0274009 A1 | 11/2011 | Cooper |
| 2011/0274101 A1 | 11/2011 | Cooper |
| 2011/0294514 A1 | 12/2011 | Kulkarni |
| 2013/0121191 A1 | 5/2013 | Song et al. |
| 2013/0210447 A1 | 8/2013 | Moe et al. |
| 2013/0322235 A1 | 12/2013 | Khoryaev et al. |
| 2014/0128088 A1 | 5/2014 | Farhadi |
| 2014/0198659 A1 | 7/2014 | Vargas Bautista et al. |
| 2014/0235259 A1 | 8/2014 | Salami et al. |
| 2015/0043390 A1 | 2/2015 | Wang et al. |
| 2015/0085677 A1 | 3/2015 | Pourahmadi et al. |
| 2015/0092627 A1 | 4/2015 | Liu |
| 2015/0117327 A1 | 4/2015 | Nordstrom et al. |
| 2015/0119057 A1 | 4/2015 | Fujito |
| 2015/0173011 A1* | 6/2015 | Das ................. H04W 24/02 370/328 |
| 2015/0215879 A1 | 7/2015 | Zhu et al. |
| 2015/0365941 A1 | 12/2015 | Liu et al. |
| 2015/0373550 A1 | 12/2015 | Hong et al. |
| 2016/0007361 A1 | 1/2016 | Andersson et al. |
| 2016/0037523 A1 | 2/2016 | Wei et al. |
| 2016/0056907 A1* | 2/2016 | Wei ................. H04J 3/1694 370/280 |
| 2016/0112177 A1 | 4/2016 | Zheng et al. |
| 2016/0278100 A1 | 9/2016 | Sawai |
| 2016/0360538 A1 | 12/2016 | Jwa et al. |
| 2016/0374119 A1 | 12/2016 | Choi et al. |
| 2017/0099617 A1 | 4/2017 | Tomici |
| 2017/0265068 A1 | 9/2017 | Cui et al. |
| 2018/0242392 A1 | 8/2018 | Liu |
| 2019/0215829 A1 | 7/2019 | MacKenzie et al. |
| 2019/0246284 A1 | 8/2019 | MacKenzie et al. |

FOREIGN PATENT DOCUMENTS

| | | |
|---|---|---|
| CN | 102131200 A | 7/2011 |
| CN | 102186174 A | 9/2011 |
| CN | 103338453 A | 10/2013 |
| CN | 103379498 A | 10/2013 |
| CN | 103442369 A | 12/2013 |
| CN | 104105174 A | 10/2014 |
| CN | 104159258 A | 11/2014 |
| CN | 104254081 A | 12/2014 |
| CN | 104918256 A | 9/2015 |
| CN | 104955077 A | 9/2015 |
| CN | 105101227 A | 11/2015 |
| CN | 105120467 A | 12/2015 |
| CN | 103442369 B | 4/2016 |
| CN | 105636066 A | 6/2016 |
| CN | 105813212 A | 7/2016 |
| CN | 104159258 B | 3/2018 |
| CN | 104254081 B | 5/2018 |
| EP | 2 779 728 A1 | 9/2014 |
| EP | 2 822 340 A1 | 1/2015 |
| EP | 2822340 B1 | 9/2016 |
| WO | WO 2012/139653 A1 | 10/2012 |
| WO | WO-2012159270 A1 | 11/2012 |
| WO | WO 2013/015255 A1 | 1/2013 |
| WO | WO 2013/075340 A1 | 5/2013 |
| WO | WO 2014/012192 A1 | 1/2014 |
| WO | WO-2014035415 A1 | 3/2014 |
| WO | WO-2014113941 A1 | 7/2014 |
| WO | WO 2014/179967 A1 | 11/2014 |

OTHER PUBLICATIONS

International Search Report and Written Opinion for corresponding PCT Application No. PCTEP2017/074083, dated Dec. 18, 2017, 14 pages.

International Search Report and Written Opinion for corresponding International Application No. PCT/EP2017/074132 dated Dec. 6, 2017; 12 pages.

International Preliminary Report on Patentability for corresponding International Application No. PCT/EP2015/067278 dated Oct. 12, 2016; 15 pages.

U.S. Appl. No. 16/336,256, filed Mar. 25, 2019, Inventor(s): MacKenzie et al.

U.S. Appl. No. 16/336,304, filed Mar. 25, 2019, Inventor(s): MacKenzie et al.

Application and Filing Receipt for U.S. Appl. No. 15/503,567, filed Feb. 13, 2017, Inventor(s): Saffre et al.

Hatoum et al., "FCRA: Femtocell Cluster-based Resource Allocation Scheme for OFDMA Networks"; ICC 2011—2011 IEEE International Conference on Communications—Jun. 5-9, 2011—Kyoto, Japan, IEEE, Piscataway, NJ, USA, pp. 1-6, XP031908466, DOI: 10.1109/ICC.2011.5962705, ISBN: 978-1-61284-232-5; 7 pages total.

Fan Song et al: "A Clustering-Based Downlink Resource Allocation Algorithm for Small Cell Networks", 2015 International Conference on Wireless Communications & Signal Processing (WCSP), IEEE, Oct. 15, 2015 (Z815-10-15), pp. 1-5, XP832828554, DOI: 10. 1109/WCS P. 2015. 7341194, 5 pages total.

Potevio: "Consideration on the Informing of Carrier Pattern in Carrier Based HetNet ICIC", 3GPP Draft; R3-112546, 3rd Generation Partnership Project (3GPP), Mobile Competence Centre ; 650, Route Des Lucioles ; F-06921 Sophia-Antipolis Cedex; France, vol. RAN WG3, No. Zhuhai; 20111010, Sep. 30, 2011 (Sep. 30, 2011), XP050542189 2 pages total.

Zubin Bharucha et al: "Dynamic Resource Partitioning for Downlink Femto-to-Macro-Cell Interference Avoidance", Eurasip Journal on Wireless Communications and Networking,vol. 8, No. 7, Jan. 1, 2010 (Jan. 1, 2010), p. 3498, XP055123525, ISSN: 1687-1499, DOI: 10.1155/2010/143413, 12 pages total.

Potevio: "Consideration of carrier pattern design for carrier based EICIC", 3GPP Draft; R3-112063, 3rd Generation Partnership Project (3GPP), Mobile Competence Centre; 650, Route Des Lucioles ; F-06921 Sophia-Antipolis Cedex, France, vol. RAN WG3, No. Athens, Greece; 20110822, Sep. 9, 2011 (Sep. 9, 2011), XP050541692, 3 pages total.

Ericsson: "DL Interference enhancements for Carrier-based HetNet ICIC", 3GPP Draft; R3-120728-DL-Interference, $3^{rd}$ Generation Partnership. Project (3GPP), Mobile Competence Centre; 650, Route Des Lucioles ; F-06921 Sophia-Antipolis Cedex, France, vol. RAN WG3, No. Cabo; Mar. 26, 2012-Mar. 30, 2012, Apr. 2, 2012 (Apr. 2, 2012), XP050669079, Retrieved from the Internet: URL:http://www.3gpp.org/ftp/tsg ran/WG3Iu/TSGR375bisjDocsj, 3 pages total.

Laselva et al., "Self-Optimisation," LTE Self-Organising Networks (SON) Network Management Automation for Operational Efficiency, First Edition (2012) John Wiley & Sons, Ltd; p. 135-234, 100 pages total.

Liang et al., "Resource allocation with interference avoidance in OFDMA femotcell networks," IEEE Transactions on Vehicular Technology (2012) vol. 61, No. 5; p. 2243-2255, 13 pages total.

Shahid et al., "A decentralized heuristic approach towards resource allocation in femtocell networks," Entropy (2013) 15; p. 2524-2547, 24 pages total.

International Preliminary Report on Patentability, Application No. PCT/EP2017/074059, dated Apr. 11, 2019, 8 pages.

(56) References Cited

OTHER PUBLICATIONS

International Preliminary Report on Patentability, for corresponding PCT Application No. PCTEP2017/074083, dated Apr. 11, 2019, 11 pages.
International Preliminary Report on Patentability, for corresponding PCT Application No. PCTEP2017/074132, dated Apr. 2, 2019, 9 pages.
International Search Report and Written Opinion for corresponding International Application No. PCT/EP2015/067278 dated Oct. 5, 2016; 14 pages.
International Search Report and Written Opinion for Application No. PCT/EP2017/074083, dated Dec. 18, 2017, 14 pages.
Shahid, et al., "A Decentralized Heuristic Approach Towards Resource Allocation in femtocell networks," Entropy, 2013, vol. 15, pp. 2524-2547.
Communication pursuant to Article 94(3) EPC For EP Application No. 17772398.8, dated Jul. 20, 2020, 5 pages.
Communication pursuant to Article 94(3) EPC for EP Application No. 17777543.4, dated Dec. 10, 2020, 9 pages.
Communication pursuant to Article 94(3) EPC For EP Application No. 17780039.8, dated Dec. 11, 2020, 9 pages.
Extended European Search Report for Application No. EP14275174. 2, dated Apr. 9, 2015, 7 pages.
Written Opinion of the International Preliminary Examining Authority for Application No. PCT/EP2015/067278, dated Jul. 25, 2016, 5 pages.
Broadcom Corporation "Interference Management for Small Cell Enhancements," 3GPP TSG RAN WG1 Meeting #72bis, R1-131474, Apr. 15-19, 2013, 4 pages.
Office Action for Chinese Application No. 201610874455.5, dated May 21, 2021, 11 pages.
Office Action for Chinese Application No. 201610875313.0, dated May 24, 2021, 14 pages.
Office Action for Chinese Application No. 201610875596.9, dated May 7, 2021, 11 pages.
Communication pursuant to Article 94(3) EPC for European Application No. 17777543.4 dated Feb. 17, 2022, 7 pages.

\* cited by examiner

RESOURCE MANAGEMENT METHOD

CROSS-REFERENCE TO RELATED APPLICATION

The present application claims priority to International Application No. PCT/EP2017/074132 filed Sep. 22, 2017, and Chinese Application No.: 201610875596.9 filed Sep. 30, 2016 which is hereby incorporated herein in its entirety by reference.

TECHNICAL FIELD

The present disclosure relates to the field of communications, and in particular to a resource management method and apparatus for a cell cluster and a communications system.

BACKGROUND

Ultra-Dense Networks (UDNs) have powerful capabilities of spectral reuse, which may satisfy a requirement of a future radio communications system for large-capacity communications, hence, they are deemed as a key technology in the future of radio communications systems. In an ultra-dense network, a communication capacity is usually improved by deploying multiple Small Cells (SCs), each having a short range but deployed in such a way as to have overlapping ranges. Short-haul signal transmission is performed between Small Base Stations (SBSs) providing communication services and user equipment within coverage ranges of the small cells. However, as the small cells are densely deployed, harmful mutual interference is produced between small cells using the same radio resources, which is more severe to those small cells using the same resources at edges of a macro cell.

Several methods are known for reducing interference between cells (such as the small cells in the above UDN), for example improving performance of cell-edge user equipment via a COordinated MultiPoint (COMP), which is carried out by a joint processing technology. Another method is to process interference via Inter-Cell Interference Coordination (ICIC), in which uplink and downlink usable resources are reported between neighboring cells, and related messages need to be transmitted via an X2 interface.

However, when CoOrdinated MultiPoint (COMP) is used, a large quantity of information regarding user equipment needs to be shared between multiple base stations in a very short time, and in an ultra-dense network, it is possible that some user equipment has no ideal backhaul, or there is more interference to be coordinated immediately. In this case, a capacity of interference coordination is inadequate.

When the existing ICIC method is used, all usable resource information needs to be transmitted via an X2 interface, and a scalability of the network is inadequate.

SUMMARY

According to a first aspect, an embodiment provides a resource management method for a cell cluster, the cell cluster including at least one cell, the method including: transmitting resource allocation information by a base station taken as a cluster head of the cell cluster to other base stations in the cell cluster.

According to a second aspect, an embodiment provides a resource management apparatus for a cell cluster, the cell cluster including at least one cell, the resource management apparatus being arranged in a base station taken as a cluster head of the cell cluster, the apparatus including: a first exchanging unit configured to transmit resource allocation information to other base stations in the cell cluster.

According to a third aspect, an embodiment provide a communications system, the communications system including at least one macro base station and multiple base stations; a base station taken as a cluster head of a cell cluster exchanging information with the macro base station or a cluster head of a cell cluster of an upper level; the base station taken as the cluster head of the cell cluster exchanging information with a cluster head of a cell cluster of a lower level; and the base station taken as the cluster head of the cell cluster exchanging information with the other base stations in the cell cluster; wherein, the base station taken as the cluster head of the cell cluster transmits resource allocation information to the other base stations in the cell cluster.

An advantage of the embodiments is that by transmitting resource allocation information by a base station taken as a cluster head of a cell cluster to other base stations in the cell cluster, resource allocation for the cells may be performed efficiently, capabilities of coordinating inter-cell interference may be improved, and as the cell cluster may be expanded to cell clusters of a lower level or more levels, scalability of the network may be improved.

Features that are described and/or illustrated with respect to one embodiment may be used in the same way or in a similar way in one or more other embodiments and/or in combination with or instead of the features of the other embodiments.

BRIEF DESCRIPTION OF THE DRAWINGS

Embodiments will now be described, aided by the accompanying Figures in which.

DETAILED DESCRIPTION

In the embodiments of the present disclosure, as used herein, a base station may include: an access point; a broadcast transmitter; a nodeB or an evolved nodeB (eNB), etc., and may include a device having some or all functions of the aforementioned device. As used herein, the term "base station" includes a device that provides communication coverage for a specific geographical region. As used herein, term "cell" includes a base station and/or a coverage region thereof, depending on context.

A mobile station or equipment may be referred to as user equipment (UE). The UE may be fixed or mobile, and may also be referred to as a mobile station, a terminal, an access terminal, a user unit, or a station, etc. The UE may be a cellular phone, a personal digital assistant (PDA), a wireless modem, a wireless communication device, a handhold device, a lap-top computer, and a cordless telephone, etc.

The first embodiment provides a resource management method for a cell cluster, which is applicable to a base station taken as a cluster head of a cell cluster. In this embodiment, an application scenario of the method shall be illustrated taking an Ultra-Dense Network (UDN) as an example.

The communications system is divided into at least three levels, which are, for example, in a descending order of the levels, a macro base station (a macro cell), a cell cluster (such as a Small Cell Cluster (SCC)) and cells in the cell cluster. However, the present invention is not limited thereto, and the communications system may include a structure of four or more levels, for example, the cell cluster may further include cell clusters of a lower level or more levels. The cell cluster may include at least one cell and in some embodiments, one of the cells is designated as a cluster head.

Figure 1:
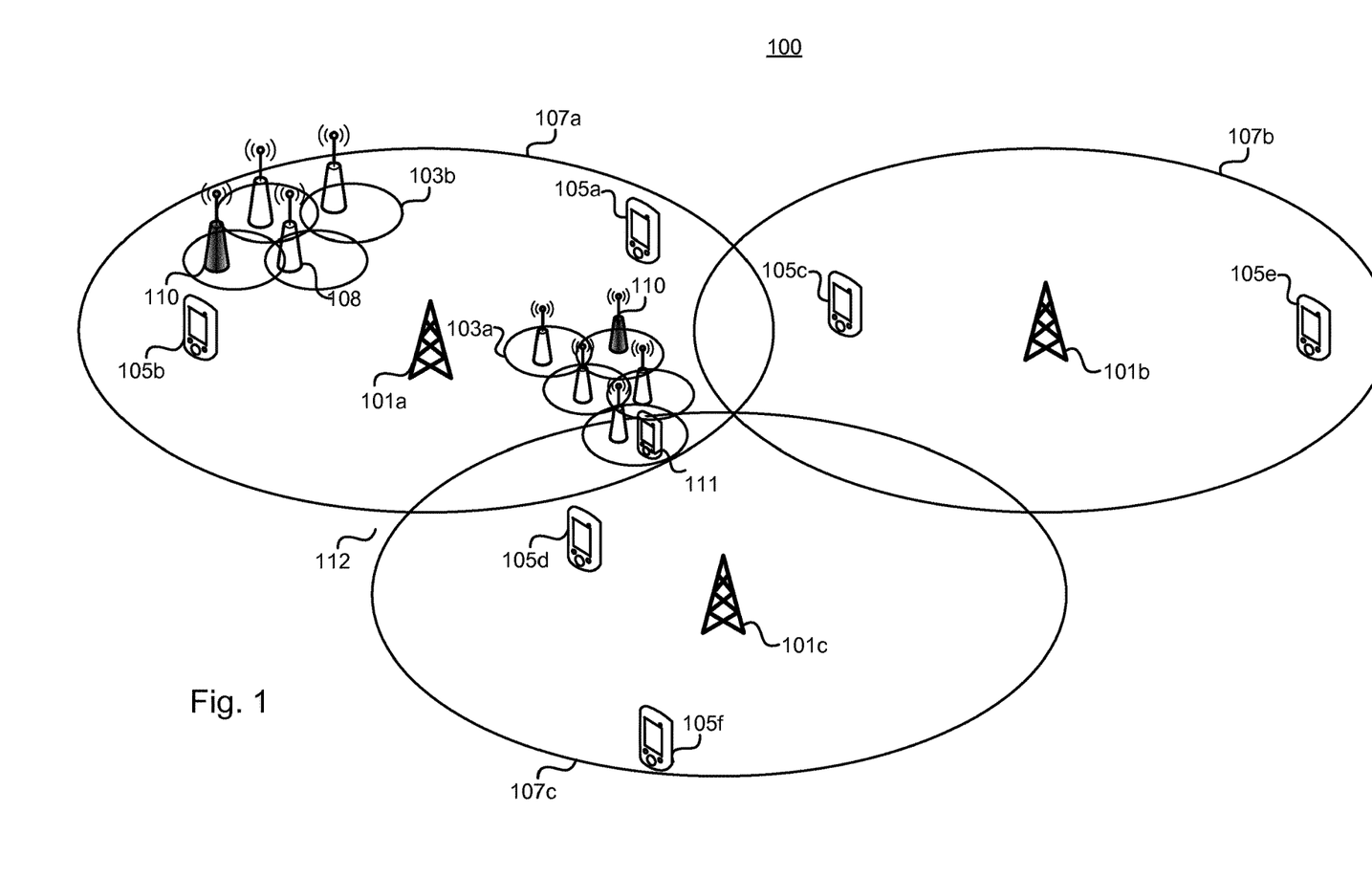
FIG. 1 is a schematic diagram of an ultra-dense network to which the resource management method and apparatus for a cell cluster in a first embodiment.

FIG. 1 is a schematic diagram of an UDN 100. The ultra-dense network 100 includes three macro base stations (MBSs) 101, which are MBS1 101a, MBS2 101b and MBS3 101c, respectively, and respectively serve three macro cells 107a, 107b, 107c.

MCU1 105a and MCU2 105b are user equipment within a coverage range of a macro cell 107a served by MBS1 101a; MCU3 105c and MCU5 105e are user equipment within a coverage range of a macro cell 107b served by MBS2 101b, and MCU4 105d and MCU6 105f are user equipment within a coverage range of a macro cell served by MBS3 101c.

At an edge of the coverage range of the macro cell served by MBS1, there are two small cell clusters (SCCs), SCC1 103a and SCC2 103b, both of which are constituted by multiple small cells SCU 108 within a similar coverage range of the macro cell MBS 1. Furthermore, one of the SCUs is designated as a cluster head 110 for the small cell cluster 103a and a user equipment 111 is shown in the range of the small cell cluster SCC1 103a. Taking SCC1 103a as an example, when two or more small cells in SCC1 use same resources for communication, interference will occur between these small cells.

Figure 2:
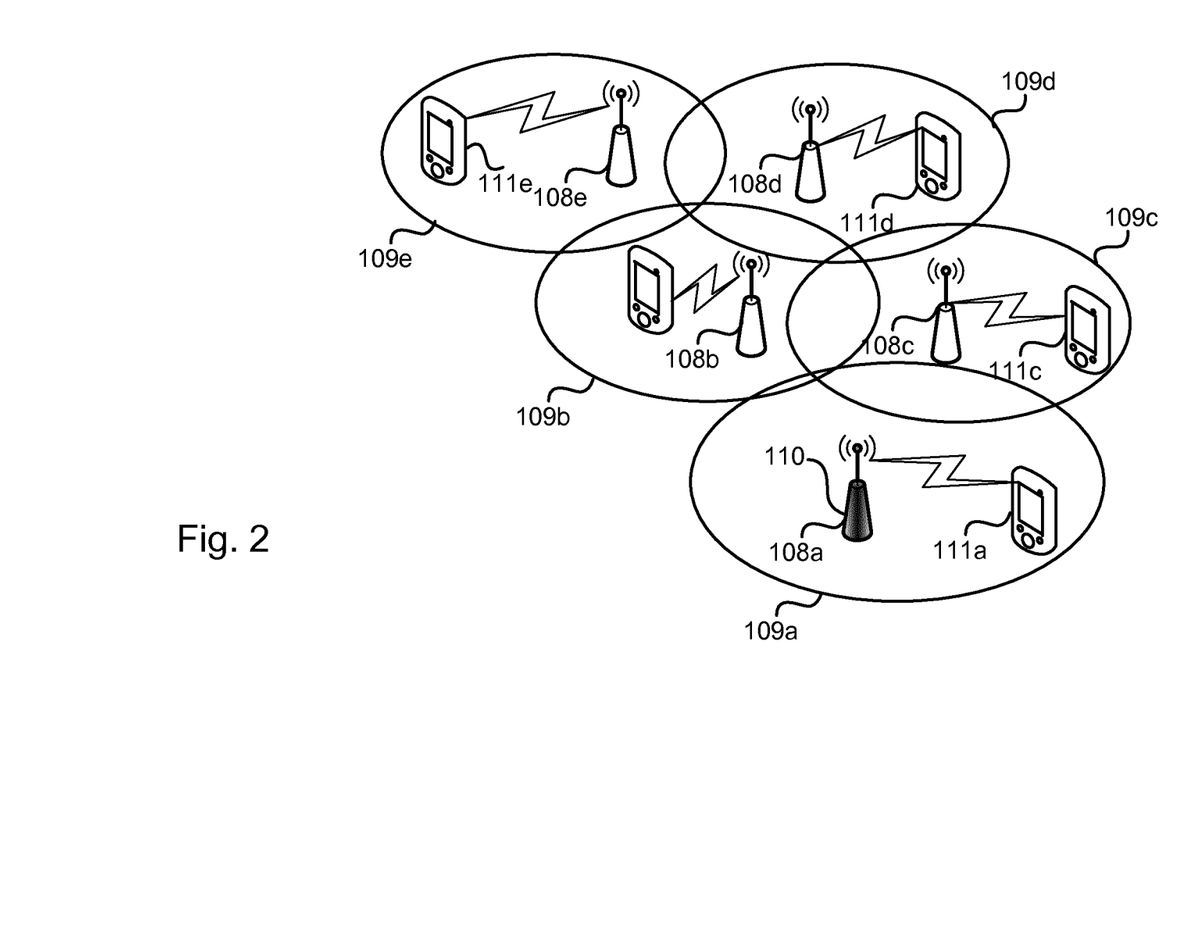
FIG. 2 is a schematic diagram of a cell cluster shown in FIG. 1.

FIG. 2 is a schematic diagram of the small cell cluster SSC1 103a shown in FIG. 1. The small cell cluster 103a includes five small cells, SC1-SC5 109a-109e, and small base stations served for them are SBS1-SBS5 108a-108e, respectively. In the small cells 109, the small base stations SBS1-SBS5 108a-108e communicate with user equipment SCU1-SCU5 111a-111e within a coverage range of the small cells, respectively. Furthermore, in FIG. 2, one of the small base stations SBS1 108a is acting as a cluster head for the small cell cluster and so also has the reference 110.

The small cells SC1-SC5 in FIGS. 1 and 2 constitute "the cell cluster", the small cells SC1-SC5 may be equivalent to "cells", and the small base stations SBS1-SBS5 may be equivalent to "base stations. Of course, the network structure of the embodiments of the present invention may further be expanded, and the above correspondence relationships are illustrative only.

Figure 3:
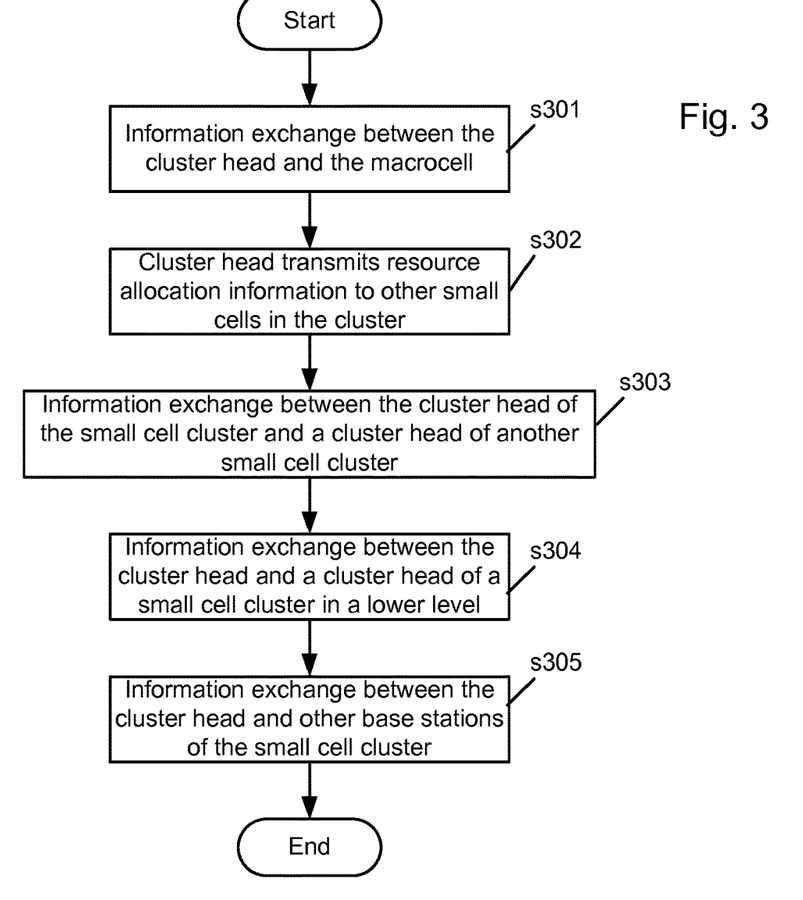
FIG. 3 is a flowchart of the resource management method.

FIG. 3 is a flowchart of the resource management method for a cell cluster as performed by the cluster head 110.

In s301 resource allocation information is transmitted by the cluster head 110 to other base stations in the cell cluster.

In this embodiment, the method further includes the following steps:

In s302 information is exchanged between the cluster head and a macro base station or a cluster head of a cell cluster of an upper level.

In s303 information is exchanged between the cluster head and a cluster head of another cell cluster of the same level as the cell cluster.

In s304 information is exchanged between the cluster head and a cluster head of a cell cluster of a lower level; and In s305: further information other than resource allocation information is exchanged between the cluster head and the other base stations in the cell cluster.

There is no determined temporal order relationship between s301-s305, and an order of executing the steps is not limited.

It can be seen from the above embodiment that by transmitting the resource allocation information by the base station taken as the cluster head 110 of the cell cluster to the other base stations in the cell cluster, resource allocation for the cells may be performed efficiently, capabilities of coordinating inter-cell interference may be improved, and as the cell cluster 103 may be expanded to cell clusters of a lower level or more levels, scalability of the network may be improved.

The cell cluster 103 may be established by a macro base station 101 of a macro cell 107 to which the cell cluster 103 belongs, and may also be established by another macro base station 101. The cluster head 110 of the cell cluster may be designated by the macro base station 101, and may also be changed by the macro base station. Furthermore, cell clusters 103 within a coverage range of a macro cell 107 served by the macro base station 101 may also be reorganized by the macro base station.

Therefore, when the cluster head of the cell cluster is a base station serving for a cell in the cell cluster, the base station taken as the cluster head transmits the resource allocation information to base stations of other cells than the cell where the cluster head is located, and does not transmit the resource allocation information to itself.

For example, as shown in FIG. 2, SBS1 108a in SBS1-SBS5 may be taken as the cluster head 110, and in this case, SBS1 110 transmits the resource allocation information to SBS2 108b, SBS3 108c, SBS4 108d and SBS5 108e. If an independent base station other than SBS1-SBS5 is provided and taken as the cluster head of the cell cluster, and in this case, the independent base station transmits the resource allocation information to SBS1-SBS5.

The base station taken as the cluster head transmits the resource allocation information to the other base stations in multiple ways. For example, it may transmit via an X2 interface, or may transmit via broadcast or multicast.

Resources allocated in the resource allocation information include at least one of a spectrum resource, a time resource, and a space resource, and this embodiment is described taking the spectrum resource as an example.

In this embodiment, the resource allocation information may be preobtained, or may be generated by receiving some information.

In s302, the base station taken as the cluster head of the cell cluster receives the information on the usable resources of the cell cluster from the macro base station or the cluster head of the cell cluster of an upper level.

In this case, the base station taken as the cluster head generates the resource allocation information according to the information on the usable resources of the cell cluster, and transmits the resource allocation information to the other base stations in the cell cluster.

In this embodiment, the macro base station may be a macro base station adjacent to the cell cluster, and may also be another macro base station.

As shown in FIG. 1, the base station taken as the cluster head 110 of the cell cluster SCC1 103a receives the information on the usable resources of the cell cluster SCC1 from the macro base station MBS1 101a, generates the resource allocation information according to the information on the usable resources, and transmits the resource allocation information to another base station in SCC1, thereby achieving resource allocation of the cells in SCC1.

The information on the usable resources of the cell cluster received by the base station taken as the cluster head from the macro base station or the cluster head of the cell cluster of an upper level is, for example, reusable spectrum resource information (RSRI).

The reusable spectrum resource information may be determined by the macro base station or the cluster head of the cell cluster of an upper level. For example, the macro base station or the cluster head of the cell cluster of an upper level determines the reusable spectrum resource information of the cell cluster according to at least one of a policy of an operator, a position of the cell cluster, feedback of the cell cluster, information exchange with a neighboring macro base station or a cluster head of a cell cluster of the same level as the cell cluster of an upper level, and scheduling information.

The macro base station or the cluster head of the cell cluster of an upper level may determine different reusable spectrum resource information for different cell clusters within its coverage range.

In this embodiment, the cluster head 110 is further operable to: update the resource allocation information; and transmit the updated resource allocation information to the other base stations in the cell cluster.

The base station taken as the cluster head of the cell cluster may update the resource allocation information in a predetermined period, and transmit the updated resource allocation information to the other base stations; and it may also be that the macro base station or the cluster head of the cell cluster of an upper level updates the reusable spectrum resource information of the cell cluster and transmits the information to the base station taken as the cluster head, and the base station taken as the cluster head updates the resource allocation information according to the updated reusable spectrum resource information.

Furthermore, it may also be that the base station taken as the cluster head updates the resource allocation information after receiving some requests from the other base stations, which shall be illustrated below.

Figure 4:
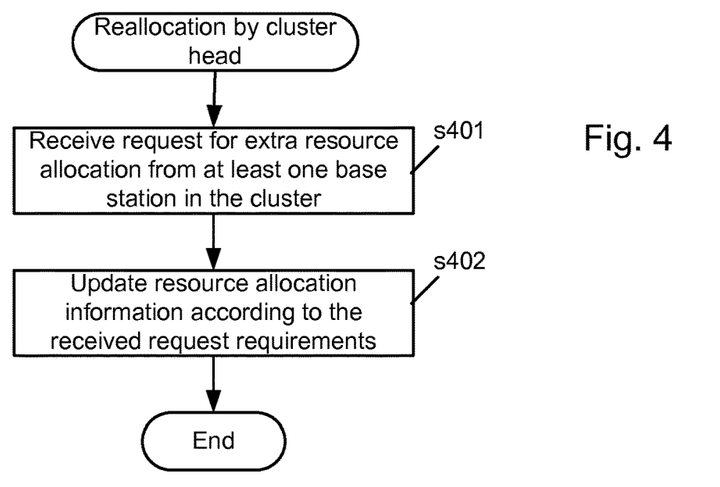
FIG. 4 is a flowchart of a method for updating resource allocation information.

FIG. 4 is a flowchart of a method for updating the resource allocation information.

In s401: a request for extra resource allocation is received from at least one other base station by the base station taken as the cluster head of the cell cluster; and In s402: the resource allocation information is updated by the base station taken as the cluster head of the cell cluster according to the request for extra resource allocation.

Hence, when resource competition occurs between the cells in the cell cluster, the base station taken as the cluster head updates the resource allocation information according to the request from the at least one other base station, that is, performing resource allocation again, which may efficiently deal with the resource competition between the cells, and further reducing interference.

In performing the resource allocation in the cell cluster, the base station taken as the cluster head may, for example, orthogonal resources may be allocated to the cells.

In this embodiment, "orthogonal" may not be completely orthogonal in the strict sense, i.e., there completely exists no interference between the cells. Taking a frequency domain resource as an example, the "orthogonal" may be soft fractional frequency reuse (soft FFR).

As shown in FIG. 2, if reusable spectrum resource of the cell cluster has three different bands. Then SBS1 108a in the cell SC1 109a and SBS5 108e in the cell SC5 109e are respectively allocated to use the same first band, SBS2 108b in the cell SC2 109b and SBS4 108d in the cell SC4 109d are respectively allocated with using the same second band, and SBS3 108c in the cell SC3 109c is allocated with using a third band.

In this embodiment, the base station taken as the cluster head may update the resource allocation information according to the priority of the at least one other base station transmitting the request for extra resource allocation, the priority of the service provided by the at least one other base station or the priority of the user equipment.

For example, after receiving a request for occupying extra resource allocation from the other base stations, the base station taken as the cluster head first attempts to allocate resources that are not currently used, and when there exists no idle resource currently or idle resources cannot satisfy demands of the other base stations and what is demanded by the other base stations is occupying an extra resource in a short time, the base station taken as the cluster head may update the resource allocation information according to the priority of the other base stations, such as transmitting instructions for suspending communications to base stations of relatively low priorities, or lowering transmission power of the base stations of relatively low priorities.

In this embodiment, the priorities of the base stations may be predetermined. For example, the priorities of the base stations are determined according to a policy of an operator.

Figure 5:
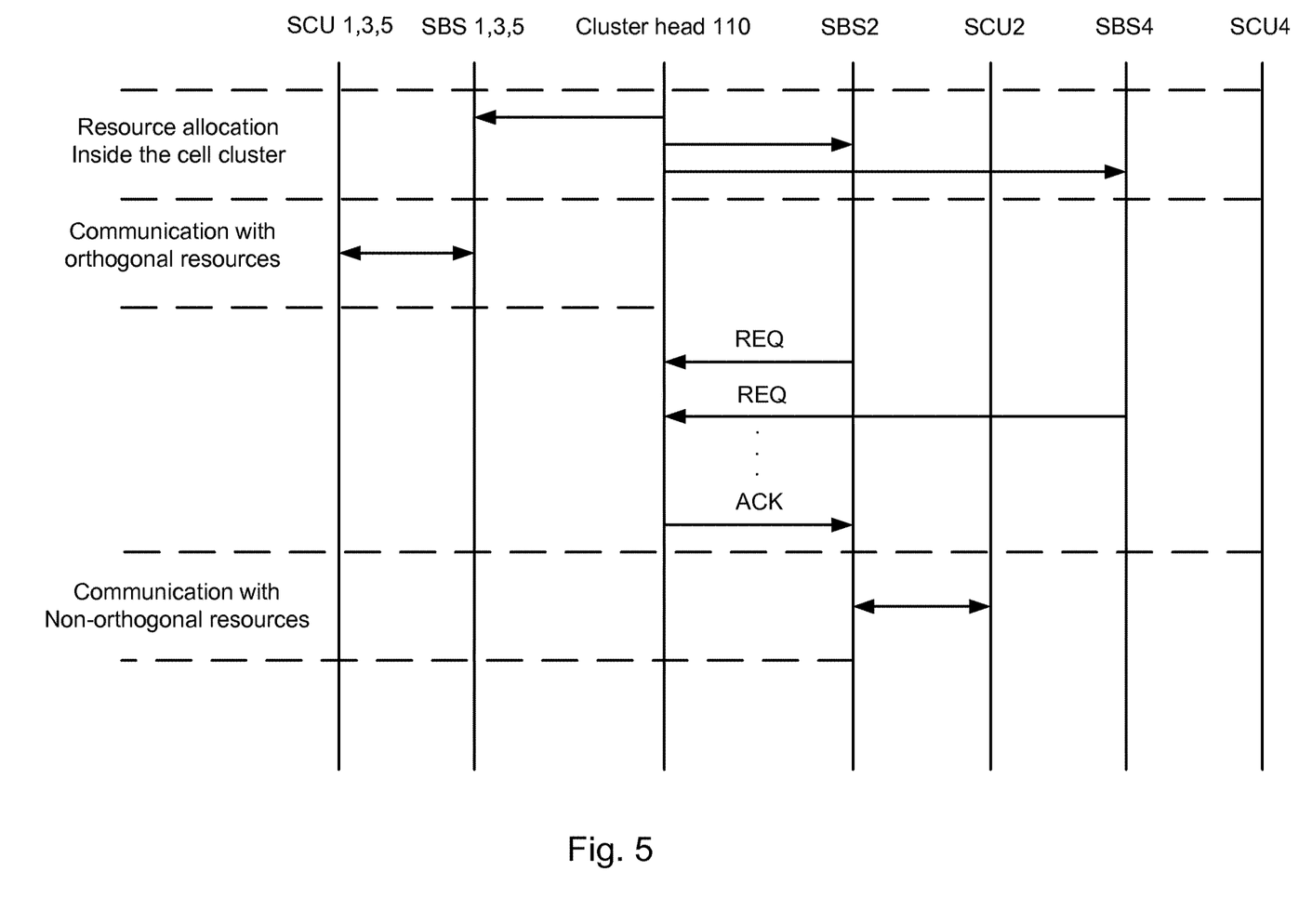
FIG. 5 is a schematic diagram of interference coordination within the cell cluster.

FIG. 5 is a schematic diagram of interference coordination within the cell cluster. As shown in FIG. 5, the base station taken as the cluster head 110 is a base station independent of SBS1-SBS5, and transmits the resource allocation information to SBS1-SBS5 for performing resource allocation within the cell cluster, and SBS1, SBS3 and SBS5 use orthogonal resources to communicate with user equipment in the respective cells.

As shown in FIGS. 2 and 5, for example, SBS2 and SBS4 are allocated with using the same resource (the second band), and SBS2 has a priority higher than that of SBS4. When both SBS2 and SBS4 transmit requests (REQs) for using an extra resource to the base station taken as the cluster head, as SBS2 has a higher priority, the base station taken as the cluster head transmits an acknowledgement message (ASK) to SBS2 and allocates an extra resource for SBS2, and furthermore, requires SBS4 to suspend the communication or lower the transmission power.

In this embodiment, when some events occur, the base station taken as the cluster head transmits a request for reorganizing the cell cluster to the macro base station or the cluster head of the cell cluster of an upper level. For example, when the base station taken as the cluster head cannot satisfy requests of the other base stations for using resources, it transmits a request for reorganizing to the macro base station or the cluster head of the cell cluster of an upper level. The base station taken as the cluster head of the cell cluster may transmit the information on usable resources of the cell cluster of a lower level to the cluster head of the cell cluster of a lower level, and the base station taken as the cluster head of the cell cluster of a lower level may transmit the resource allocation information to the other base stations in the cell cluster of a lower level.

A refining level of allocating resources of the cluster head of the cell cluster of a lower level is higher than or equal to a refining level of allocating resources of a cluster head of a cell cluster of a previous level of the cell cluster of a lower level, and usable resources for resource allocation of the cluster head of the cell cluster of a lower level is less than or equal to usable resources for resource allocation of the cluster head of the cell cluster of a previous level of the cell cluster of a lower level.

It can be seen from the above embodiment that by transmitting the resource allocation information by the base station taken as the cluster head of the cell cluster to the other base stations in the cell cluster, resource allocation for the cells may be performed efficiently, capabilities of coordinating inter-cell interference may be improved, and as the cell cluster may be expanded to cell clusters of a lower level or more levels, scalability of the network may be improved.

Figure 6:
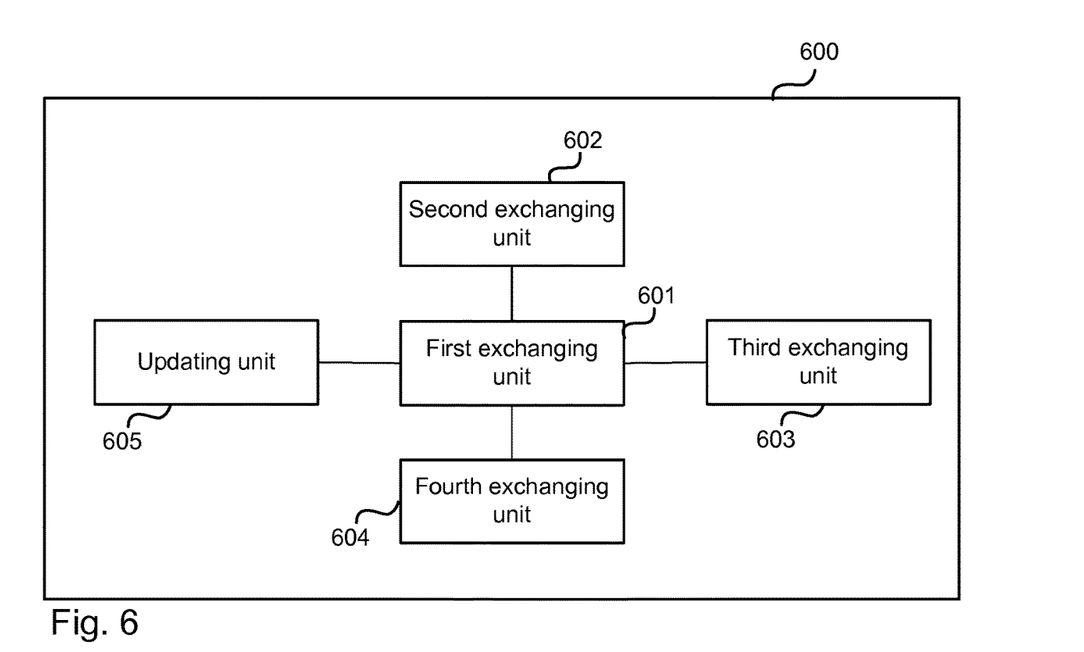
FIG. 6 is a schematic diagram of the resource management apparatus for a cell cluster.

FIG. 6 is a schematic diagram of the resource management apparatus for a cell cluster. As shown in FIG. 2, the apparatus 600 includes: a first exchanging unit 601 configured to transmit resource allocation information to other base stations in the cell cluster; a second exchanging unit 602 configured to exchange information with a macro base station or a cluster head of a cell cluster of an upper level; a third exchanging unit 603 configured to exchange information with a cluster head of another cell cluster of the same level as the cell cluster; and a fourth exchanging unit 604 configured to exchange information with a cluster head of a cell cluster of a lower level; and the first exchanging unit 601 further exchanges other information than the resource allocation information with the other base stations in the cell cluster.

The second exchanging unit 602 receives information on usable resources of the cell cluster from the macro base station or the cluster head of the cell cluster of an upper level; and in this case, the first exchanging unit 601 generates the resource allocation information according to the information on usable resources of the cell cluster, and transmits the resource allocation information to the other base stations in the cell cluster.

In this embodiment, the first exchanging unit 601, the second exchanging unit 602, the third exchanging unit 603 and the fourth exchanging unit 604 may mutually perform data transmission.

In this embodiment, the apparatus 600 further includes: an updating unit 605 configured to update the resource allocation information.

And in this case, the first exchanging unit 601 transmits the updated resource allocation information to the other base stations in the cell cluster.

For example, the first exchanging unit 601 may receive a request for extra resource allocation from at least one other base station, and the updating unit 605 updates the resource allocation information according to the request for extra resource allocation.

The second exchanging unit 602 may be configured to transmit a request for reorganizing the cell cluster to the macro base station or the cluster head of the cell cluster of an upper level.

The fourth exchanging unit 604 may exchange information with the cluster head of the cell cluster of a lower level, such as transmitting the information on usable resources of the cell cluster of a lower level to the cluster head of the cell cluster of a lower level; and In this embodiment, a refining level of allocating resources of the cluster head of the cell cluster of a lower level is higher than or equal to a refining level of allocating resources of a cluster head of a cell cluster of a previous level of the cell cluster of a lower level, and usable resources for resource allocation of the cluster head of the cell cluster of a lower level is less than or equal to usable resources for resource allocation of the cluster head of the cell cluster of a previous level of the cell cluster of a lower level.

It can be seen from the above embodiment that by transmitting the resource allocation information by the base station taken as the cluster head of the cell cluster to the other base stations in the cell cluster, resource allocation for the cells may be performed efficiently, capabilities of coordinating inter-cell interference may be improved, and as the cell cluster may be expanded to cell clusters of a lower level or more levels, scalability of the network may be improved.

Figure 7:
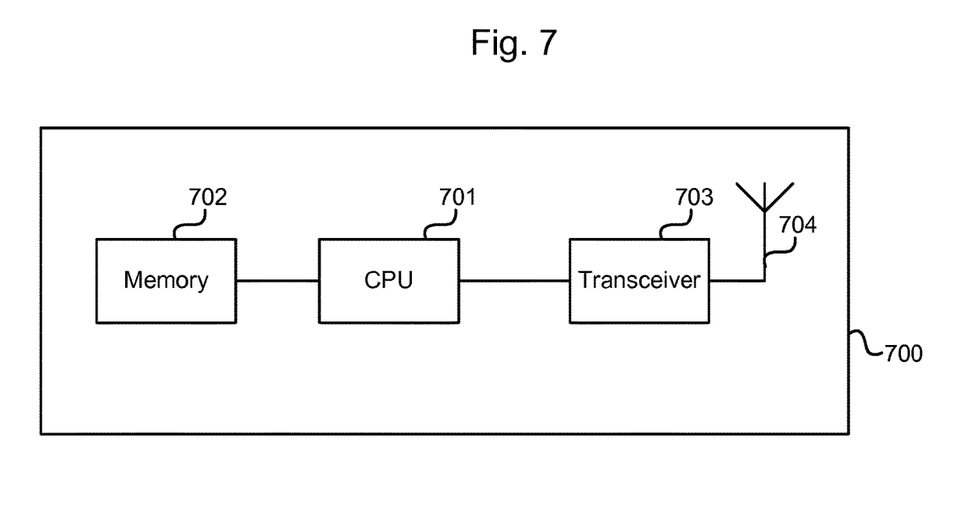
FIG. 7 is a schematic diagram of a structure of a base station.

FIG. 7 is a schematic diagram of the base station of the embodiment of the present invention. As shown in FIG. 7, the base station 700 may include a central processing unit (CPU) 701 and a memory 702, the memory 702 being coupled to the central processing unit 701. For example, the memory 702 may store various data, and furthermore, it may store a program for information processing, and execute the program under control of the central processing unit 701.

For example, the central processing unit 701 may be configured to perform the following control: transmitting resource allocation information by a base station taken as a cluster head of the cell cluster to other base stations in the cell cluster.

Furthermore, as shown in FIG. 7, the base station 700 may include a transceiver 703, and an antenna 704, etc.; wherein, functions of the above components are similar to those in the related art, and shall not be described herein any further. It should be noted that the base station 700 does not necessarily include all the parts shown in FIG. 7, and furthermore, the base station 700 may include parts not shown in FIG. 7, and the related art may be referred to.

An embodiment further provides a computer-readable program, wherein when the program is executed in a resource management apparatus for a cell cluster or a base station, the program enables the resource management apparatus for a cell cluster or the base station to carry out the resource management method for a cell cluster as described above.

An embodiment provides a storage medium in which a computer-readable program is stored, wherein the computer-readable program enables a resource management apparatus for a cell cluster or a base station to carry out the resource management method for a cell cluster as described in Embodiment 1.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods as described above. The present disclosure also relates to a storage medium for storing the above program, such as a hard disk, a floppy disk, a CD, a DVD, and a flash memory, etc.

The method/apparatus described with reference to the embodiments of the present disclosure may be directly embodied as hardware, a software module executed by a processor, or a combination thereof. For example, one or more of the block diagrams and/or one or more combinations of the block diagrams shown in FIG. 6 may correspond to soft modules of a process of a computer program, and may also correspond to hardware modules.

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in figures may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof. And they may also be realized as a combination of computing equipment, such as a combination of a DSP and a microprocessor, multiple processors, one or more microprocessors in communication combination with a DSP, or any other such configuration.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principles of the present disclosure, and such variants and modifications fall within the scope of the present invention.

Alternatives and Modifications

In one embodiment, the cluster head of the cell cluster is a base station serving for a cell in the cell cluster, i.e., a serving base station of a cell. In an alternative, the cluster head is another base station other than one of the base stations serving for cells in the cell cluster.

When the cluster head of the cell cluster is another base station than the base stations serving for the cells in the cell cluster, the small base station taken as the cluster head transmits the resource allocation information to base stations of all cells in the cell cluster.

Furthermore, when the cell cluster includes only one cell, then the base station taken as the cluster head does not transmit the resource allocation information to the other base stations. When another cell joins in the cell cluster, then base station taken as the cluster head transmits the resource allocation information to a base station of the other cell.

For implementations of the present disclosure containing the above embodiments, following supplements are further disclosed.

Supplement 1. A resource management method for a cell cluster, the cell cluster including at least one cell, characterized in that the method includes: transmitting resource allocation information by a base station taken as a cluster head of the cell cluster to other base stations in the cell cluster.

Supplement 2. The method according to supplement 1, characterized in that the method includes at least one of the following: exchanging information by the base station taken as the cluster head of the cell cluster with a macro base station or a cluster head of a cell cluster of an upper level; exchanging information by the base station taken as the cluster head of the cell cluster with a cluster head of another cell cluster of the same level as the cell cluster; exchanging information by the base station taken as the cluster head of the cell cluster with a cluster head of a cell cluster of a lower level; and exchanging other information than the resource allocation information by the base station taken as the cluster head of the cell cluster with the other base stations in the cell cluster.

Supplement 3. The method according to supplement 2, characterized in that the exchanging information by the base station taken as the cluster head of the cell cluster with a macro base station or a cluster head of a cell cluster of an upper level includes: receiving information on usable resources of the cell cluster from the macro base station or the cluster head of the cell cluster of an upper level by the base station taken as the cluster head of the cell cluster; and the transmitting resource allocation information by a base station taken as a cluster head of the cell cluster to other base stations in the cell cluster includes: generating the resource allocation information by the base station taken as the cluster head of the cell cluster according to the information on usable resources of the cell cluster, and transmitting the resource allocation information to the other base stations in the cell cluster.

Supplement 4. The method according to supplement 3, characterized in that, the information on usable resources of the cell cluster is information on reusable spectral resources.

Supplement 5. The method according to supplement 1, characterized in that, the base station taken as the cluster head of the cell cluster is a base station serving for a cell in the cell cluster, or the base station taken as the cluster head of the cell cluster is another base station than base stations serving cells in the cell cluster.

Supplement 6. The method according to supplement 1, characterized in that the method further includes: updating the resource allocation information by the base station taken as the cluster head of the cell cluster; and transmitting the updated resource allocation information by the base station taken as the cluster head of the cell cluster to the other base stations in the cell cluster.

Supplement 7. The method according to supplement 6, characterized in that the updating the resource allocation information by the base station taken as the cluster head of the cell cluster includes: receiving a request for extra resource allocation from at least one other base station by the base station taken as the cluster head of the cell cluster; and updating the resource allocation information by the base station taken as the cluster head of the cell cluster according to the request for extra resource allocation.

Supplement 8. The method according to supplement 7, characterized in that the updating the resource allocation information by the base station taken as the cluster head of the cell cluster according to the request for extra resource allocation includes: updating the resource allocation information by the base station taken as the cluster head of the cell cluster according to a priority of the at least one other base station transmitting the request for extra resource allocation, a priority of a service provided by the at least one other base station or a priority of user equipment.

Supplement 9. The method according to supplement 1, characterized in that the method further includes: transmitting a request for reorganizing the cell cluster by the base station taken as the cluster head of the cell cluster to the macro base station or the cluster head of the cell cluster of an upper level.

Supplement 10. The method according to supplement 1, characterized in that the method further includes: transmitting the information on usable resources of the cell cluster of a lower level by the base station taken as the cluster head of the cell cluster to the cluster head of the cell cluster of a lower level; and transmitting the resource allocation information by the base station taken as the cluster head of the cell cluster of a lower level to the other base stations in the cell cluster of a lower level.

Supplement 11. The method according to any one of supplements 1-10, characterized in that, a refining level of allocating resources of the cluster head of the cell cluster of a lower level is higher than or equal to a refining level of allocating resources of a cluster head of a cell cluster of a previous level of the cell cluster of the lower level, and usable resources for resource allocation of the cluster head of the cell cluster of a lower level is less than or equal to usable resources for resource allocation of the cluster head of the cell cluster of a previous level of the cell cluster of the lower level.

Supplement 12. The method according to any one of supplements 1-11, characterized in that, resources allocated in the resource allocation information include at least one of a spectrum resource, a time resource, and a space resource.

Supplement 13. A resource management apparatus for a cell cluster, the cell cluster including at least one cell, the resource management apparatus being arranged in a base station taken as a cluster head of the cell cluster, characterized in that the apparatus includes: a first exchanging unit configured to transmit resource allocation information to other base stations in the cell cluster.

Supplement 14. The apparatus according to supplement 13, characterized in that the apparatus includes at least one of the following units: a second exchanging unit configured to exchange information with a macro base station or a cluster head of a cell cluster of an upper level; a third exchanging unit configured to exchange information with a cluster head of another cell cluster of the same level as the cell cluster; and a fourth exchanging unit configured to exchange information with a cluster head of a cell cluster of a lower level; and the first exchanging unit further exchanges other information than the resource allocation information with the other base stations in the cell cluster.

Supplement 15. The apparatus according to supplement 14, characterized in that the second exchanging unit receives information on usable resources of the cell cluster from the macro base station or the cluster head of the cell cluster of an upper level; and the first exchanging unit generates the resource allocation information according to the information on usable resources of the cell cluster, and transmits the resource allocation information to the other base stations in the cell cluster.

Supplement 16. The apparatus according to supplement 15, characterized in that, the information on the usable resources of the cell cluster is reusable spectrum resource information. Supplement 17. The apparatus according to supplement 13, characterized in that, the cluster head of the cell cluster is a base station serving for a cell in the cell cluster, or the cluster head of the cell cluster is another base station than base stations serving for cells in the cell cluster.

Supplement 18. The apparatus according to supplement 13, characterized in that the apparatus further includes: an updating unit configured to update the resource allocation information.

Supplement 19. The apparatus according to supplement 15, characterized in that, the first exchanging unit receives a request for extra resource allocation from at least one other base station in the cell cluster; and the updating unit updates the resource allocation information according to the request for extra resource allocation.

Supplement 20. The apparatus according to supplement 19, characterized in that, the updating unit updates the resource allocation information according to the priority of the at least one other base station transmitting the request for extra resource allocation, the priority of the service provided by the at least one other base station or the priority of the user equipment.

Supplement 21. The apparatus according to supplement 13, characterized in that, the second exchanging unit transmits a request for reorganizing the cell cluster to the macro base station or the cluster head of the cell cluster of an upper level.

Supplement 22. The apparatus according to supplement 13, characterized in that, the fourth exchanging unit transmits the information on usable resources of the cell cluster of a lower level to the cluster head of the cell cluster of a lower level.

Supplement 23. The apparatus according to any one of supplements 13-22, characterized in that, a refining level of allocating resources of the cluster head of the cell cluster of a lower level is higher than or equal to a refining level of allocating resources of a cluster head of a cell cluster of a previous level of the cell cluster of the lower level, and usable resources for resource allocation of the cluster head of the cell cluster of a lower level is less than or equal to usable resources for resource allocation of the cluster head of the cell cluster of a previous level of the cell cluster of the lower level.

Supplement 24. The apparatus according to any one of supplements 13-23, characterized in that, resources allocated in the resource allocation information include at least one of a spectrum resource, a time resource, and a space resource.

Supplement 25. A communications system, characterized in that the communications system includes at least one macro base station and multiple base stations; a base station taken as a cluster head of a cell cluster exchanging information with the macro base station or a cluster head of a cell cluster of an upper level; the base station taken as the cluster head of the cell cluster exchanging information with a cluster head of a cell cluster of a lower level; and the base station taken as the cluster head of the cell cluster exchanging information with the other base stations in the cell cluster; wherein, the base station taken as the cluster head of the cell cluster transmits resource allocation information to the other base stations in the cell cluster.

Supplement 26. The communications system according to supplement 25, characterized in that, the cell cluster is located at an edge of a coverage range of a cell served by the macro base station or the cluster head of the cell cluster of an upper level.

The invention claimed is:

1. A resource management method for a cell cluster, the cell cluster comprising at least one cell, wherein the method comprises:

receiving information on usable resources of the cell cluster from a macro base station or from a cluster head of the cell cluster of an upper level by a base station taken as the cluster head of the cell cluster;

generating resource allocation information by the base station taken as the cluster head of the cell cluster according to the information on the usable resources of the cell cluster; and transmitting the generated resource allocation information by the base station taken as a cluster head of the cell cluster to other base stations in the cell cluster, wherein a level to which allocation of resources is performed by the cluster head of the cell cluster of a lower level is higher than or equal to a level to which allocation of resources is performed by a cluster head of a cell cluster of a previous level of the cell cluster of the lower level, and usable resources for resource allocation of the cluster head of the cell cluster of a lower level are less than or equal to usable resources for resource allocation of the cluster head of the cell cluster of a previous level of the cell cluster of the lower level.

2. The method according to claim 1, wherein the method comprises at least one of the following:

exchanging information by the base station taken as the cluster head of the cell cluster with the macro base station or the cluster head of the cell cluster of the upper level;

exchanging information by the base station taken as the cluster head of the cell cluster with a cluster head of another cell cluster of a same level as the cell cluster;

exchanging information by the base station taken as the cluster head of the cell cluster with a cluster head of a cell cluster of a lower level; or exchanging other information than the resource allocation information by the base station taken as the cluster head of the cell cluster with the other base stations in the cell cluster.

3. The method according to claim 1, wherein the information on the usable resources of the cell cluster is information on reusable spectral resources.

4. The method according to claim 1, wherein the base station taken as the cluster head of the cell cluster is a base station serving a cell in the cell cluster, or the base station taken as the cluster head of the cell cluster is another base station than base stations serving cells in the cell cluster.

5. The method according to claim 1, wherein the method further comprises:

updating the resource allocation information by the base station taken as the cluster head of the cell cluster; and transmitting the updated resource allocation information by the base station taken as the cluster head of the cell cluster to the other base stations in the cell cluster.

6. The method according to claim 5, wherein updating the resource allocation information by the base station taken as the cluster head of the cell cluster comprises:

receiving a request for extra resource allocation from at least one other base station by the base station taken as the cluster head of the cell cluster; and updating the resource allocation information by the base station taken as the cluster head of the cell cluster according to the request for the extra resource allocation.

7. The method according to claim 6, wherein updating the resource allocation information by the base station taken as the cluster head of the cell cluster according to the request for extra resource allocation comprises:

updating the resource allocation information by the base station taken as the cluster head of the cell cluster according to a priority of the at least one other base station transmitting the request for the extra resource allocation, a priority of a service provided by the at least one other base station or a priority of user equipment.

8. The method according to claim 1, wherein the method further comprises transmitting a request for reorganizing the cell cluster by the base station taken as the cluster head of the cell cluster to the macro base station or the cluster head of the cell cluster of an upper level.

9. The method according to claim 1, wherein the method further comprises:

transmitting the information on usable resources of the cell cluster of a lower level by the base station taken as the cluster head of the cell cluster to the cluster head of the cell cluster of the lower level; and transmitting the resource allocation information by the base station taken as the cluster head of the cell cluster of the lower level to the other base stations in the cell cluster of the lower level.

10. A resource management apparatus for a cell cluster, the cell cluster comprising at least one cell, the resource management apparatus being arranged in a base station taken as a cluster head of the cell cluster, wherein the apparatus comprises:

a first exchanging unit comprising a transmitter configured to transmit resource allocation information to other base stations in the cell cluster; and a second exchanging unit comprising a transceiver configured to receive information on usable resources of the cell cluster from a macro base station or from a cluster head of the cell cluster of an upper level by the base station taken as the cluster head of the cell cluster;

wherein the first exchanging unit further comprises a processor for generating the resource allocation information by the base station taken as the cluster head of the cell cluster according to the information on the usable resources of the cell cluster, in which a level to which allocation of resources is performed by the cluster head of the cell cluster of a lower level is higher than or equal to a level to which allocation of resources is performed by a cluster head of a cell cluster of a previous level of the cell cluster of the lower level, and usable resources for resource allocation of the cluster head of the cell cluster of a lower level are less than or equal to usable resources for resource allocation of the cluster head of the cell cluster of a previous level of the cell cluster of the lower level.

11. The apparatus according to claim 10, wherein the apparatus further comprises at least one of the following units:

a third exchanging unit comprising a transceiver configured to exchange information with a cluster head of another cell cluster of the same level as the cell cluster; and a fourth exchanging unit comprising a transceiver configured to exchange information with a cluster head of a cell cluster of a lower level.

12. The apparatus according to claim 11, wherein the second exchanging unit receives information on usable resources of the cell cluster from the macro base station or the cluster head of the cell cluster of an upper level; and the first exchanging unit generates the resource allocation information according to the information on usable resources of the cell cluster, and transmits the resource allocation information to the other base stations in the cell cluster.

13. A communications system, wherein the communications system comprises:
   at least one macro base station and multiple base stations;
   wherein a base station taken as a cluster head of a cell cluster exchanges information with the macro base station or a cluster head of a cell cluster of an upper level, the base station taken as the cluster head of the cell cluster exchanges information with a cluster head of a cell cluster of a lower level, and the base station taken as the cluster head of the cell cluster exchanges information with the other base stations in the cell cluster; and
   wherein, the base station taken as the cluster head of the cell cluster transmits resource allocation information to the other base stations in the cell cluster, and wherein allocation of resources is performed by the cluster head of the cell cluster of a lower level is higher than or equal to a level to which allocation of resources is performed by a cluster head of a cell cluster of a previous level of the cell cluster of the lower level, and usable resources for resource allocation of the cluster head of the cell cluster of a lower level are less than or equal to usable resources for resource allocation of the cluster head of the cell cluster of a previous level of the cell cluster of the lower level.

* * * * *